United States Patent [19]

Tice

[11] Patent Number: 4,859,260
[45] Date of Patent: Aug. 22, 1989

[54] APPARATUS AND METHOD FOR CUTTING AND SEALING BELT LOOP ENDS AND BELT LOOP CONSTRUCTION

[75] Inventor: William A. Tice, Knoxville, Tenn.

[73] Assignee: Tice Engineering & Sales Inc., Knoxville, Tenn.

[21] Appl. No.: 119,646

[22] Filed: Nov. 10, 1987

[51] Int. Cl.[4] .................... B32B 31/18; B32B 31/20
[52] U.S. Cl. .................... 156/88; 156/251; 156/515; 156/518; 156/530; 112/104
[58] Field of Search ............. 156/88, 251, 515, 518, 156/530; 112/104, 121.24

[56] References Cited

U.S. PATENT DOCUMENTS

| | | | |
|---|---|---|---|
| 2,551,811 | 5/1951 | Mueller | 164/77 |
| 2,740,457 | 4/1956 | Wood et al. | 156/88 |
| 3,874,976 | 4/1975 | MacFarland | 156/530 |
| 3,940,305 | 2/1976 | Gustav et al. | 156/515 |
| 4,019,947 | 4/1977 | Stock et al. | 156/515 |
| 4,706,585 | 11/1987 | Schuurmans | 112/121.27 |

Primary Examiner—Caleb Weston
Attorney, Agent, or Firm—Luedeka, Hodges & Neely

[57] ABSTRACT

An apparatus and method for cutting and sealing belt loop ends includes sealing and cutting members disposed on opposite sides of a length of fabric belt loop material formed wholly or partly of a heat sealable material. The sealing and cutting members are urged together in a scissor-like fashion to cut the strip across its width. The members are also configured to compress regions of the strip adjacent the cut ends. At least one of the sealing and cutting members is heated and the heat is transferred from the members to the compressed region adjacent the ends to melt or soften at least a portion of the meltable material. The melted or softened material merges or intermingles with the threads of the fabric in the compressed regions and upon cooling hardens to effect a seal of the belt loop at the cut ends. The seal substantially prevents the fabric from unraveling during subsequent laundering and wear. The invention may be used with a belt loop folding and feeding mechanism located adjacent a sewing station to prepare individual belt loops having sealed ends for being folded and then fed to the sewing station.

27 Claims, 5 Drawing Sheets

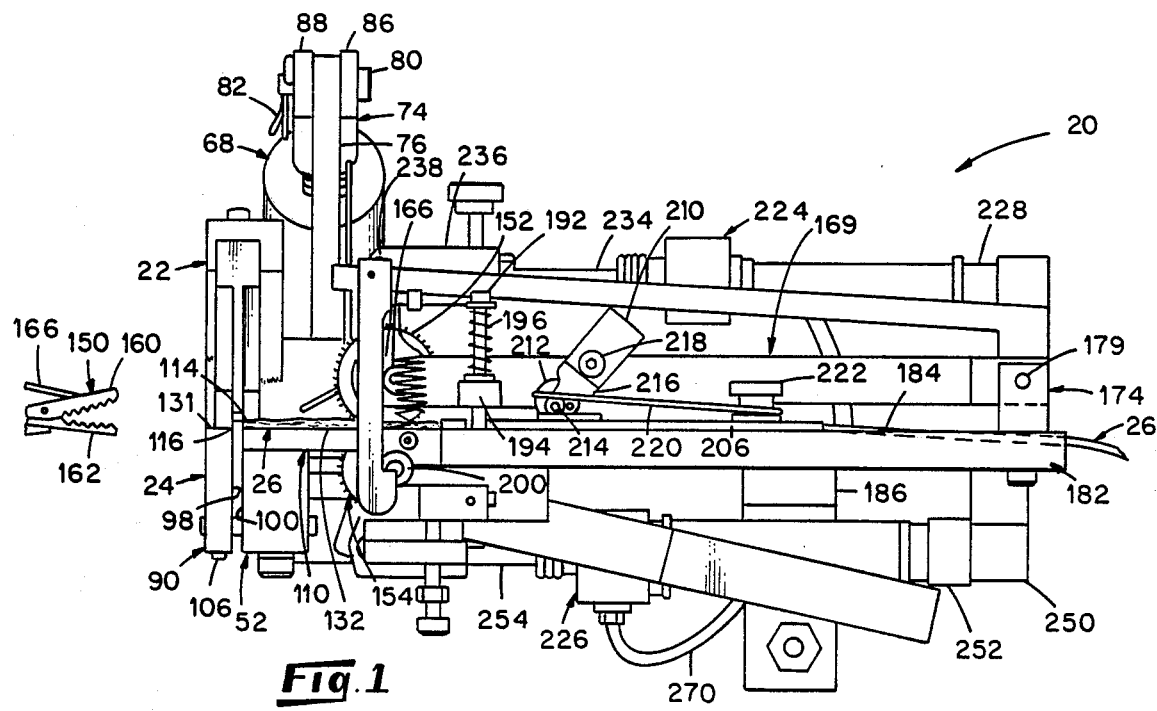
Fig. 1
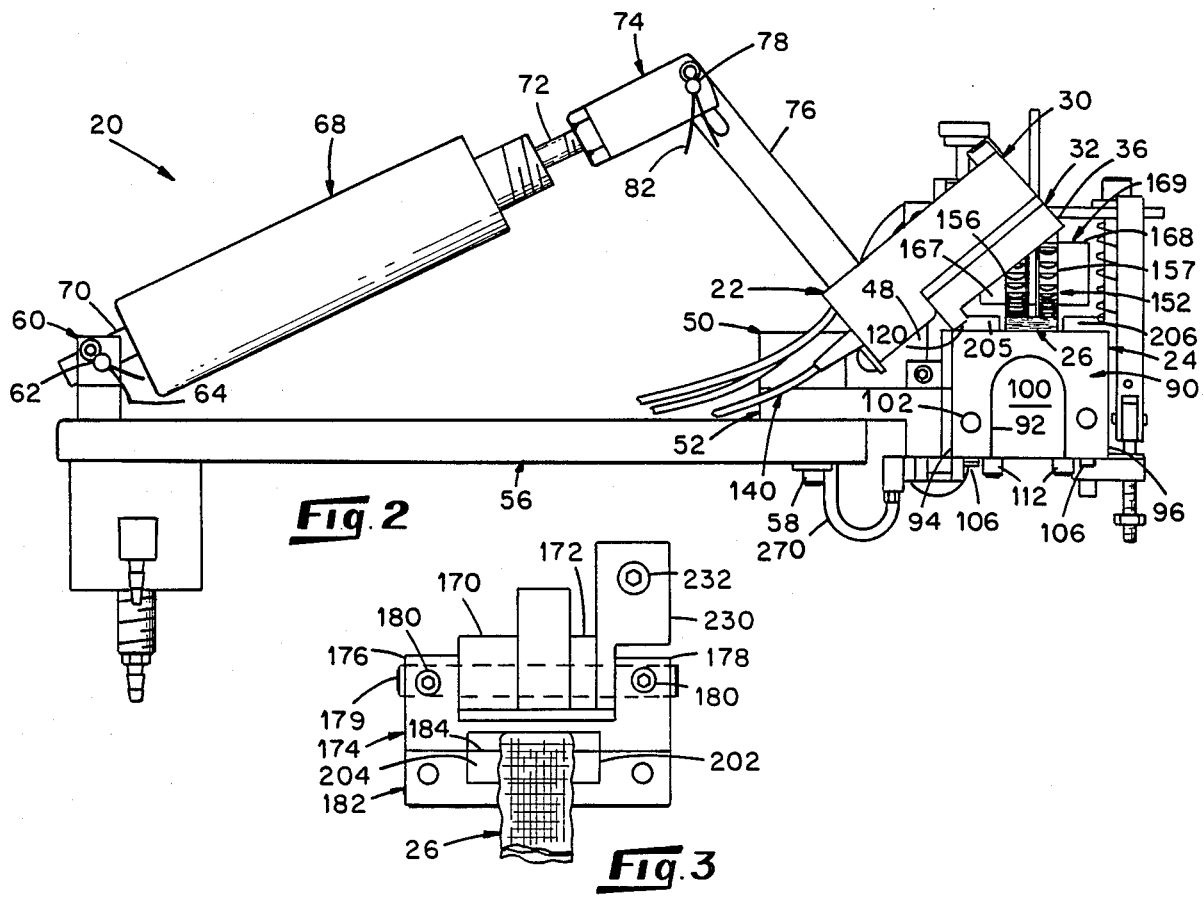
Fig. 2
Fig. 3

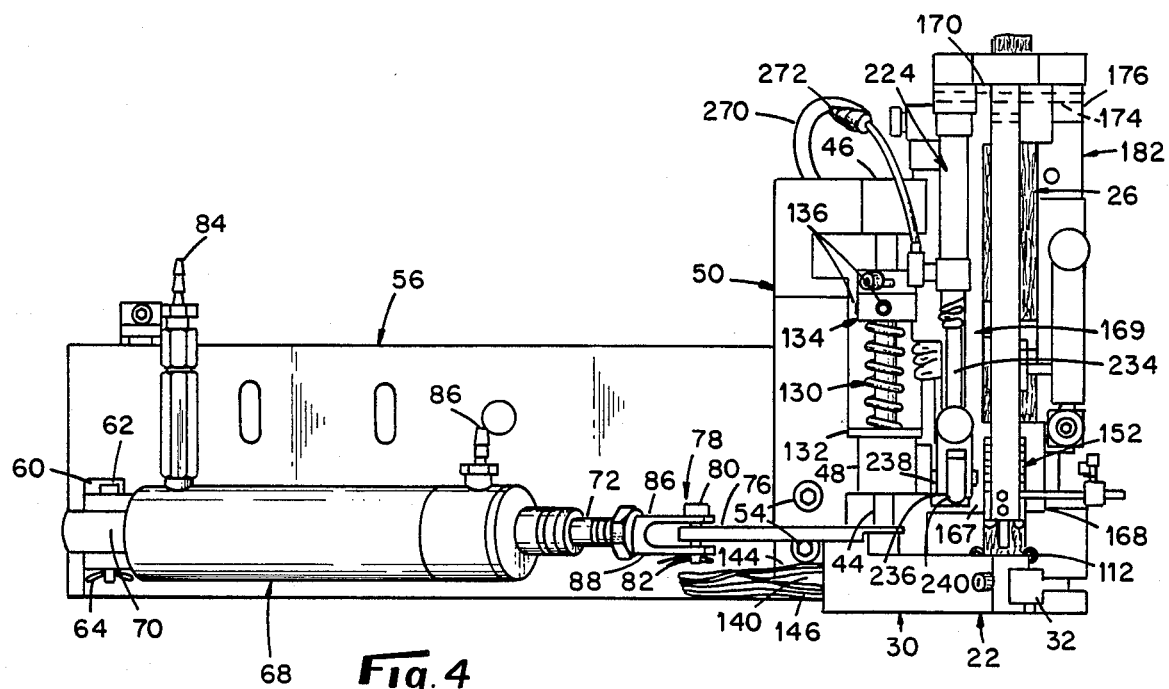
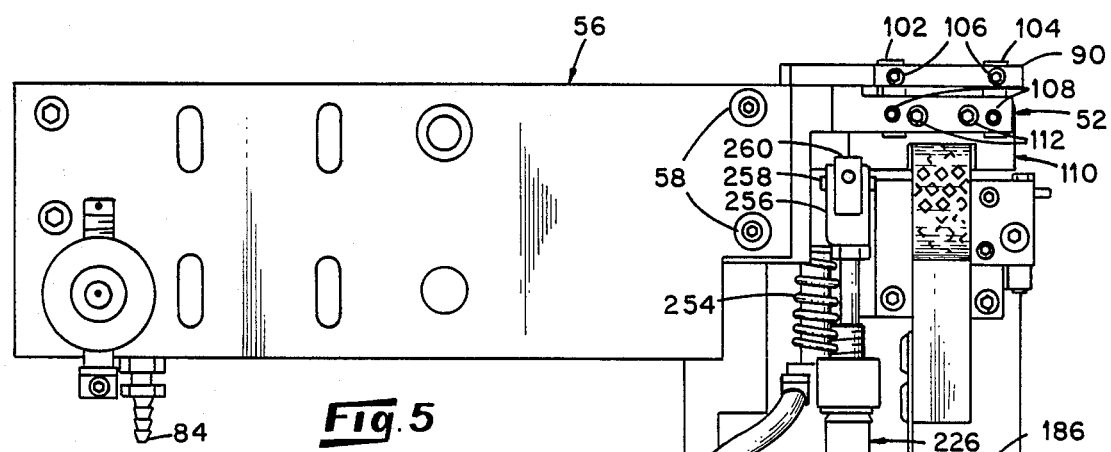
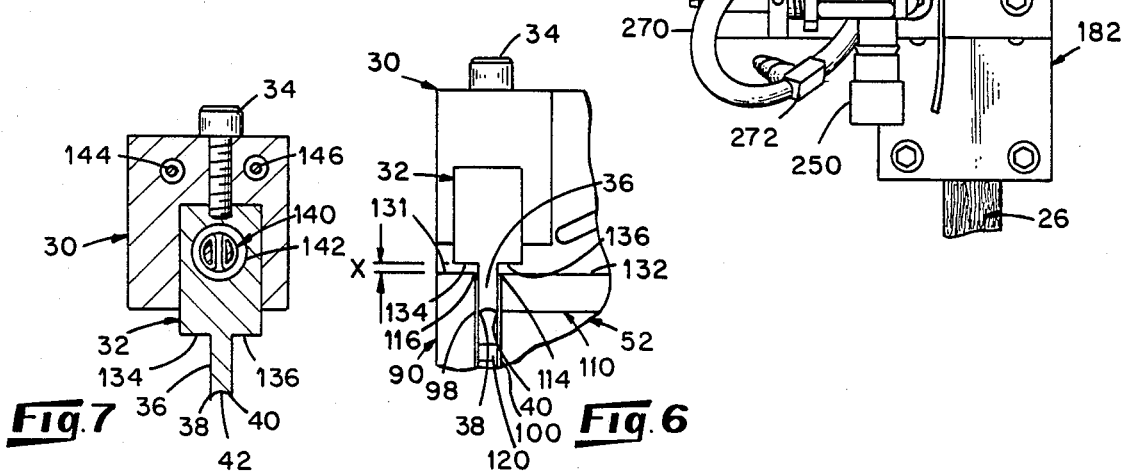

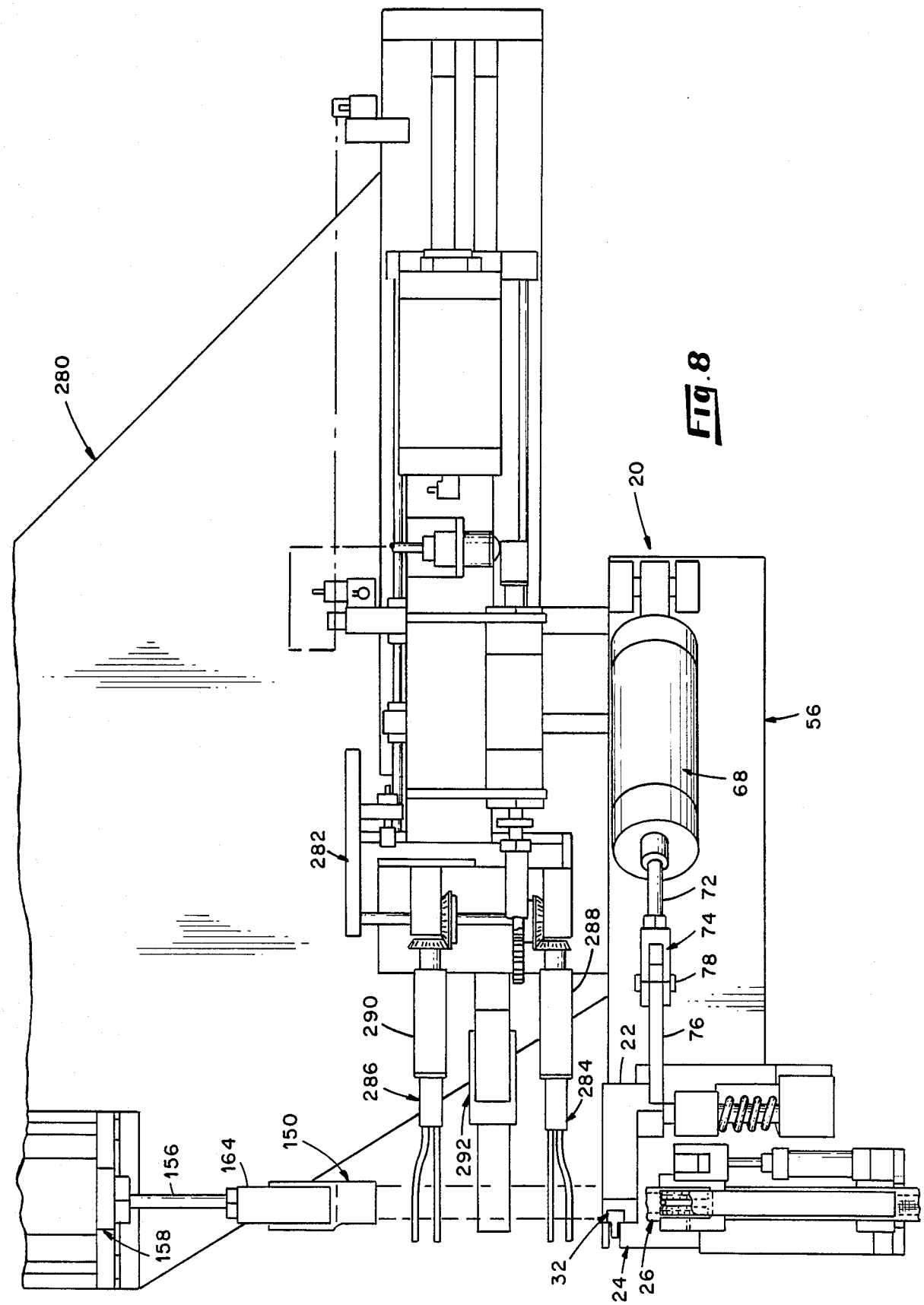

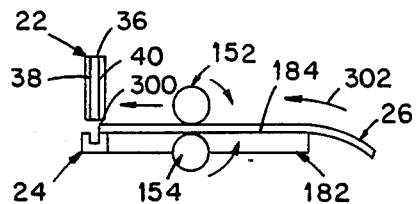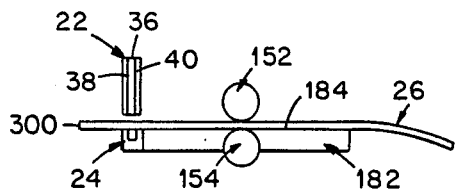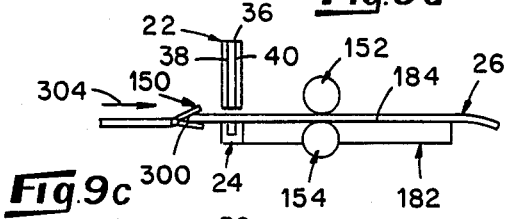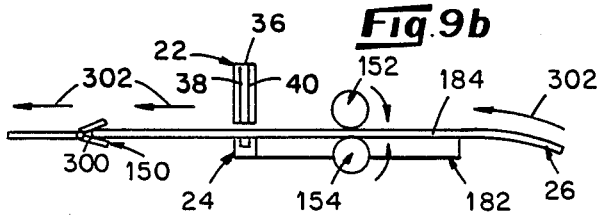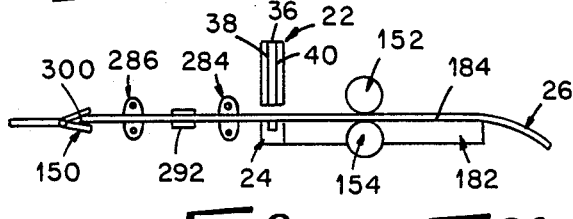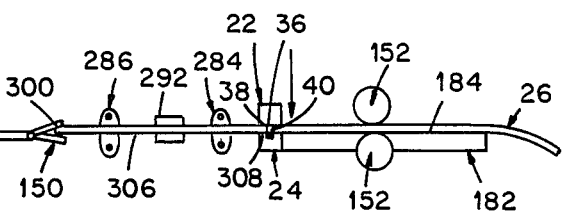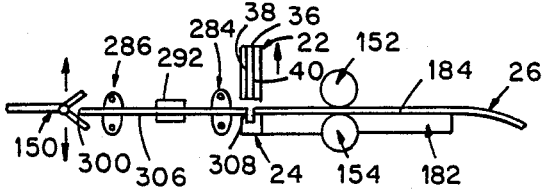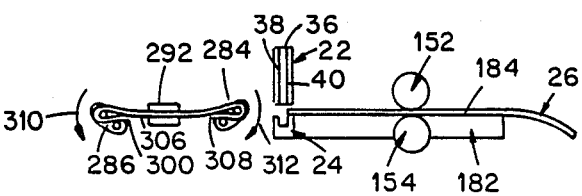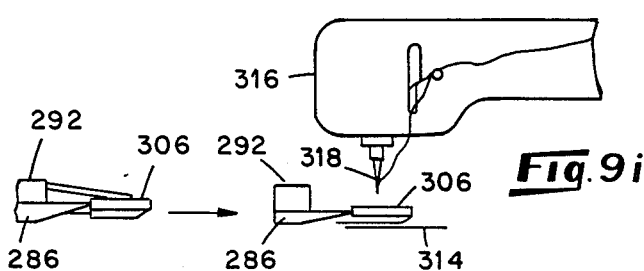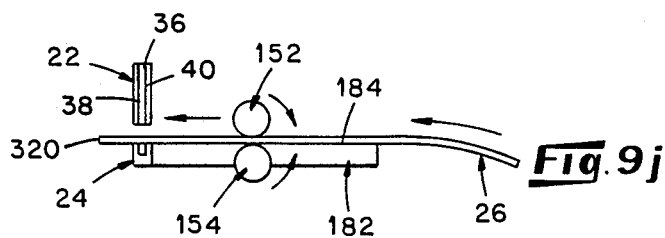

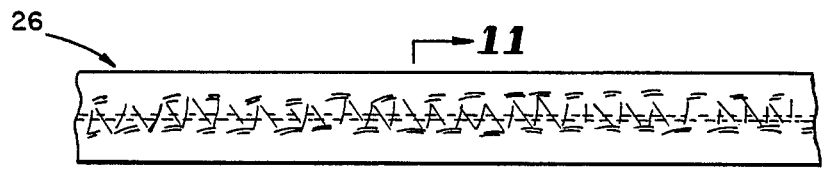
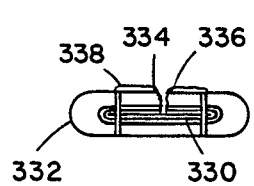
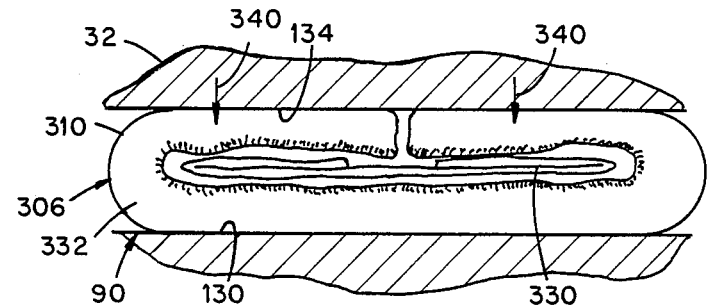
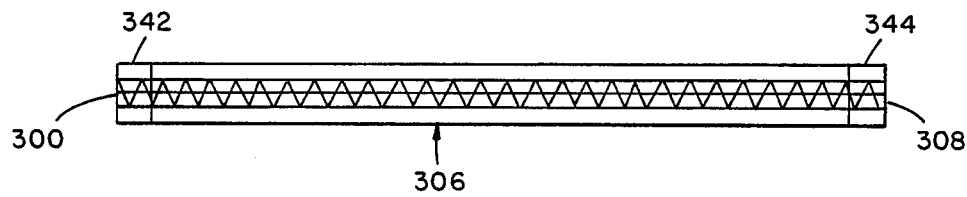

APPARATUS AND METHOD FOR CUTTING AND SEALING BELT LOOP ENDS AND BELT LOOP CONSTRUCTION

This invention relates to apparatus and methods for use in forming belt loops. In particular, the invention relates to an apparatus and method for cutting and sealing fabric belt loop ends to form a belt loop which is sealed at its opposite ends in a manner which substantially prevents the threads at the cut ends from unraveling.

Fabric loops are often attached to clothing for the purpose of providing an enclosure or guide to hold belts, ribbons, strings, and the like. Perhaps the greatest single use of fabric loops is in the formation of belt loops for pants. Often, these loops are constructed of elongate, flattened tubular strips of fabric stitched together along their side edges. The longitudinal ends of the strips are usually in the form of cut fabric edges. The strips are typically attached to the pants by folding short lengths of each opposite end of the strips inwardly upon themselves and stitching the strips to the pants by sewing through the folded ends of the strips. The strips are turned so that the folded ends are on the inside next to the pants on their waistbands and therefore are not easily visible.

During laundering and wear of the pants, the threads terminating at the cut fabric edges of the belt loops have been found to unravel. The unraveled threads stick out from the sides of the loops and detract from the appearance of the pants. The unraveling also weakens the attachment of the belt loops to the pants which, after a time, can result in the loops being pulled from the pants. These problems are especially severe with blue jeans which are constructed of denim fabric comprising relatively thick, easily unravelable thread.

Known apparatus and methods for processing or forming belt loop materials have failed to incorporate adequate provisions for eliminating subsequent unraveling of the belt loop ends. One particularly difficult problem has been the inability to fashion a means by which sealing of the belt loops may be accomplished without adversely affecting further necessary operations on the material such as folding, feeding, sewing, etc.

For example, some manufactures have attempted to seal the belt loop material prior to cutting the individual strips by incorporating a meltable substance and then passing the belt loop material over heated rollers. This method produces belt loop material which is too stiff. It has an undesirable appearance and feel.

As a consequence, a need exists for an apparatus and method adapted to seal the ends of belt loop material to prevent the belt loops from unraveling at the ends. A further need exists for an apparatus and method of the character described which can produce individual belt loops continuously and automatically and in a manner which does not adversely affect further necessary operations. A more specific need exists for an apparatus and method which is capable of producing substantially non-unraveling denim belt loops for blue jeans.

The present invention meets the above needs and others, and according to a preferred form includes an apparatus for producing individual belt loops from a ribbon of belt loop material having sealing material incorporated into the ribbon. Structure is provided for transporting the ribbon in a longitudinal direction through a work station. Means are provided at the work station for cutting the ribbon to form cuts across the width of the ribbon at spaced-apart locations to produce individual belt loops of a predetermined length. Further means are provided for sealing the ribbon only in a predetermined region adjacent the cut ends to seal the cut ends of the individual belt loops, preferably simultaneously with the cutting of the ribbon to form the individual loops. As a consequence of the above, individual belt loops are produced which are sealed against unraveling on their ends with the sealed regions being limited to predetermined regions adjacent only the cut ends rather than extending completely along the length of the loops. The invention also eliminates the need for stitching across the ends which has occasionally been required to prevent unraveling.

According to another aspect of the invention, an apparatus is provided for cutting and sealing a length of belt loop material adapted to be heat sealed at the cut ends to limit unraveling of the threads after the ends are cut. The apparatus comprises first and second cutting members for being disposed on generally opposite sides of the belt loop material. The cutting members are configured to interact to cut the belt loop material across its width when moved together with the belt loop material located between the members. Structure is provided for movably supporting the cutting members in an opposed relationship on opposite sides of the material. Means are provided for moving the cutting members together so that they engage the material therebetween and cut the material across its width to define opposed cut ends of the material. Further means are provided for heating at least one of the cutting members to a predetermined sealing temperature effective to heat seal the cut ends of the material upon the blade members being moved together to cut the material Thus, only the ends of the belt loop material are sealed. The previous apparatus and techniques for sealing belt loop material have not been widely accepted since they have produced belt loop strips that are overly stiff due to the heating of the strips along their full length which makes subsequent processing of the strips such as folding and sewing more difficult. Also, the "hand" of the strips was found to be objectionable in that it was noticeably different from that of the rest of the garment. The belt loop material of the present invention is sealed only at the ends so that any stiffness attendant the heat sealing is confined to the regions of the strip adjacent the cut ends of the material and therefore does not present a significant problem in subsequent processing of the material. The "hand" and laundering characteristics of the unsealed portion of the strip are essentially identical to those of the rest of the garment.

According to an additional aspect of the invention means are provided for conveying the length of belt loop material between the cutting members to sequentially dispose successive, spaced-apart cutting locations between the cutting members. Means are provided for moving the cutting members together when the cutting locations are disposed between the members. In this manner, a plurality of belt loop strips are produced with each having opposed cut and sealed ends. Among the advantages offered by this aspect of the invention is the capability of continuous, automated production of individual belt loop strips. For example, the apparatus may be used with conventional folding, feeding, and sewing mechanisms and configured to produce and feed the cut and sealed belt loop strips to the mechanisms automatically. This enables efficient, low cost production of belt loops having sealed ends and of forming and attaching the belt loop to garments.

In accordance with a further aspect of the invention, an apparatus is provided for sealing a strip of heat sealable belt loop material at predetermined longitudinally spaced-apart sealing locations along the length of the strip. The apparatus comprises first and second opposed sealing members and provision for conveying the strip of belt loop material longitudinally between the first and second sealing members to sequentially dispose successive, spaced-apart sealing locations of the strip between the sealing members. Structure is provided for moving the first and second sealing members together for a predetermined period of the time when the sealing locations are disposed between the members. The structure for moving the first and second sealing members together is further configured together with the first and second sealing members so that the strip of belt loop material is compressed between the members at each of the sealing locations when the members are moved together. Additional structure is provided for heating at least one of the sealing members to a predetermined sealing temperature. The temperature is determined so that the strip is heated to a sufficient degree at the sealing locations to heat seal the material at the sealing locations when the members are brought together for the predetermined period of time. After the sealing locations are advanced beyond the sealing members, the sealing locations harden upon cooling to seal the strip of the belt loop material at the sealing locations against unraveling. Preferably, the sealing members are configured and dimensioned in length to compress bands of the belt loop material therebetween at the sealing locations. The bands extend across the width of the belt loop material. Means are provided for cutting the belt loop material across its width at about the midregion of each band.

According to still another aspect of the invention, a method is provided for cutting and sealing a length of fabric belt loop material adapted to the heat-sealed to prevent unraveling of the threads when the material is cut. The method comprises disposing the fabric belt loop material at a work station, cutting the material at the work station across its width, and heating the material in a predetermined region at the cut ends to a temperature sufficient to effect a seal of the cut ends. In a preferred embodiment, the method further includes compressing the material in the predetermined region at about the time the material in the predetermined region is heated. The temperature, pressure, and length of time that the material is compressed and heated is important in achieving an adequate seal at the cut ends. In accordance with a preferred form of the method, these factors are independently controllable in order to determine the optimum conditions depending on the type of material being sealed.

According to one form of the method, disposing of the material at the work station is accomplished by statically positioning a first cutting and sealing location at the work station whereupon the cutting, heating, and compressing operations are performed to form a leading cut and sealed end of a first strip of belt loop material. The material is then advanced through the work station to locate a next cutting and sealing location at the work station which next cutting and sealing location is then statically positioned at the work station. The cutting, heating, and compressing operations are then performed to simultaneously form a trailing cut and sealed end of the first strip of belt loop material and a leading cut and sealed end of a next, succeeding strip of belt loop material. The advancing and static positioning of the material along with the cutting, heating, and compressing operations are repeated a desired number of times to produce a desired number of belt loop strips having leading and trailing cut and sealed ends.

According to yet another aspect of the invention, an enclosing member is provided for being attached to an article to provide a loop in which belts, ribbons, strings, and the like may be disposed and maintained in a desired position on the article. The enclosing member comprises an elongate strip of fabric textile material having opposite cut ends. First and second sealed end regions extend inwardly towards the longitudinal center of the strip by a predetermined distance from the opposite cut ends. Each of the regions comprises threads of the fabric and a sealing material adheringly applied to the threads to substantially prevent the threads in the sealed end regions from unraveling. Between the cut and sealed end regions, the enclosing member further includes a center region wherein the threads are relatively loosely associated with respect to adjacent threads as compared to the threads in the sealed end regions. Preferably, the heat sealing material extends along the length of the strip but is adheringly applied only in the sealed end regions. In one embodiment of the invention, the fabric textile material comprises denim fabric and the sealing material comprises a plastic material having a melting point higher than the highest expected temperature to which the member is expected to be subjected during use.

These and other aspects and advantages of the present invention will be readily appreciated by those of ordinary skill in the art as the same becomes better understood by reference to the following detailed description when considered in conjunction with the accompanying drawings in which:

FIG. 1 is a front elevational view of a belt loop sealing and cutting apparatus illustrating features of a preferred form of the present invention;

FIG. 2 is a left side elevational view of the apparatus shown in FIG. 1;

FIG. 3 is a partial right side elevational view of the apparatus shown in FIG. 1;

FIG. 4 is a top plan view of the apparatus shown in FIG. 1;

FIG. 5 is a bottom plan view of the apparatus shown in FIG. 1;

FIG. 6 is a fragmentary front view of the apparatus shown in FIG. 1 illustrating the interaction of cutter blades for effecting a cross-wise cut of a length of belt loop material;

FIG. 7 is a partial cross-sectional view of a heated block/cutter blade assembly illustrating the configuration of the blades and the location of heating elements and temperature measuring devices in the assembly;

FIG. 8 is a top plan view illustrating incorporation of the apparatus of the present invention into a belt loop folding and feeding mechanism;

FIGS. 9a through 9j are diagrammatic views illustrating a method of forming individual belt loop strips sealed at their opposite ends and of feeding the belt loops to a sewing station for attachment of the strips to a garment;

FIG. 10 is a partial view of a length of belt loop material prior to the cutting and sealing operation of the present invention;

FIG. 11 is a view along line 11—11 of the belt loop material shown in FIG. 10;

FIG. 12 is a partial cross-sectional view of the end of a belt loop following the cutting and sealing operation of the present invention; and FIG. 13 illustrates a strip of belt loop material having opposed cut and sealed ends according to a preferred form of the present invention.

Referring now to the drawings in which like reference characters refer to like or similar parts throughout the several views, various features of a preferred form of a belt loop cutting and sealing apparatus 20 are shown in FIGS. 1 through 7. In general, the apparatus 20 includes an upper, heated blade assembly 22 pivotally mounted above a lower blade assembly 24, both of which are located to the left of the apparatus 20 shown in FIG. 1. As will be described, in the preferred embodiment of the invention the upper blade assembly 22 and lower blade assembly 24 interact in a scissor-like fashion to effect both cutting and sealing of belt loop ends as a length of belt loop material 26 is moved through the apparatus 20. While cutting the length 26 into strips, the blade assemblies 22 and 24 seal the trailing and leading cut ends of adjacent strips which may be formed generally of a woven fabric comprised in whole or in part of a heat sealable material such as a plastic strip. Preferably, the strip comprises one or more layers of polyester or polyethylene film having a melting point below about 500° F.

The interaction of the blade assemblies 22 and 24 effects simultaneous cutting and sealing of the belt loop ends with the sealing preferably being accomplished by compressing the belt loops ends and transferring sufficient heat to the material to melt the plastic and seal the ends. The sealed regions adjacent the ends of the strips extend inwardly from the extreme edges thereof by a sufficient amount to substantially prevent unraveling of the fabric in the material such as occurs during laundering and wear of a garment to which the strips are attached.

Referring now to FIGS. 1 through 7 generally, the upper heated blade assembly 22 includes a rectangular mounting block 30 in which a heated blade member 32 is secured such as by means of an allen head screw 34 located in the forward end of the block 30. (See FIG. 3). As best seen in FIGS. 5 and 6, the blade member 32 includes a substantially vertical double-edged blade 36 which projects downwardly and extends generally along the length of the member 32. Preferably, the blade 36 includes an opposed, spaced-apart pair of sharpened blade edges 38 and 40 which are substantially parallel. A V-shaped groove or recess 42 is formed between the blade edges 38 and 40 so that the edges are more knife-like in character, and will therefore be impressed upon the belt loop material 26 before the body of the blade 36 begins pushing the material 26 downward which facilitates easier cutting of the material.

The mounting block 30 is fixedly attached to the end of a shaft 44 which is journaled in spaced-apart mounts 46 and 48. The mounts 46 and 48 are formed on the sides of a support member 50 and project upwardly therefrom so as to define an open space between the mounts 46 and 48 through which the shaft 44 extends along with other devices in a manner and for a purpose to be subsequently described.

As best seen in FIGS. 2 and 4, the support member 50 is mounted on an angular lower blade assembly mount 5 such as by the use of spaced-apart allen screws 54, which are received in the mount 50 so as to be flush with its upper surface. The lower blade assembly mount 52 is in turn mounted on a rectangular plate 56 adjacent the right-hand end of the plate 56 as shown in FIGS. 2 through 4 and by means of appropriately spaced allen head screws 58 with their associated washers. (See FIG. 5).

Mounted adjacent the left-hand end of the plate 56 as shown in FIGS. 2 through 4 is an upwardly projecting clevis 60 and its associated pin 62 which is maintained in the clevis 60 such as with a cotter pin 64. A double acting pneumatic cylinder 68 is pivotally mounted at its base end 70 on the pin 62 of the clevis 60 for pivoting about the axis of the pin 62 and is disposed in inclining relation to the plate 56.

The cylinder 68 carries a rod 72 which mounts a clevis 74. A downwardly directed lever arm 76 is preferably fixedly mounted to the blade assembly 22 and shaft 44 at its lower end and is pivotally connected to the clevis 74 at its upper end such as by a pin 78 associated with the clevis 74. A cotter pin 82 maintains the pin 78 in the clevis 74. The cylinder 68 is connected as at nipples 84 and 86 to a suitable source of compressed air (not shown) configured to selectively introduce compressed air into a selected one of the nipples 84 and 86 for the purpose of advancing or retracting the rod 72 as desired. Control means (not shown) are employed to independently vary the magnitude and duration of the pressure applied to the cylinder 68 so that pressure and duration of the compression of the material between the blade assemblies 22 and 24 can be varied.

Activating the cylinder 68 to cause advancement of the rod 72 pivots the blade assembly 22 about the axis of the shaft 44 by means of the connection between the blade assembly 22 and the clevis 74 afforded by the lever arm 76. This would be clockwise rotation of the assembly 22 viewing the apparatus 20 as shown in FIG. 2 which moves the assembly 22 towards the lower blade assembly 24. Preferably, the clevis 74 threadably receives the end of the rod 72 of the cylinder 68. This provides an additional means for adjustment of the pressure applied to a length of belt loop material located between the assemblies 22 and 24. For example, as more fully described hereinafter, it is preferred that the clevis 74 be positioned on the rod 72 such that the belt loop material is fully engaged between the assemblies 22 and 24 at a point just prior to full advancement of the rod 72 out of the cylinder 68 so that maximum compression may be applied to the belt loop material.

The lower blade assembly 24 includes a substantially vertically oriented blade-defining member 90 which, as shown in FIG. 2, is rectangular in configuration and includes an inverted U-shaped opening 92 in the form of an arch extending up through a substantial portion of the member 90. Downwardly projecting legs 94 and 96 are therefore defined on opposite sides of the opening 92. An inside surface 98 of the blade member 90 faces a substantially vertical surface 100 formed on the side of the mount 52. The member 90 is connected to the mount 52 and the surfaces 98 and 100 are maintained in a substantially fixed spaced-apart relation by means of a pair of substantially horizontal pins 102 and 104, the former being received in the leg 94 and in the mount 52 and the latter being received in the leg 96 and in the mount 52. As best seen in FIG. 5, the pins 102 and 104 may be secured in the blade member 90 by allen head screws 106 and in the mount 52 by allen screws 108.

The spacing between surfaces 98 and 100 may be adjusted, for example, by loosening screws 106 and sliding the blade member 90 on the pins 102 and 104 either towards or away from the mount 52 and then re-tightening the screws 106 when the desired spacing is obtained. Also, for reasons discussed more fully below, the pins 102 and 104 are preferably located near the lower ends of the legs 92 and 96 of the blade member 90.

A substantially horizontal blade member 110 of the lower blade assembly 24 is rectangular in configuration and is fixedly attached to an upper surface of the mount 52 such as by a pair of spaced-apart allen head screws 112 which enter the mount 52 from its lower surface and are threadably received in the bottom of the member 110. The upper, left-hand corner of the member 110 as viewed in FIG. 1 defines an angular cutting edge 114. This edge 114 is located generally across from an angular cutting edge 116 defined along the upper right-hand corner of the other blade member 90 of the assembly 24.

As best seen in FIG. 2, a heel end 120 in the form of a downwardly directed, rectangular projection is formed on the upper blade assembly 22 at the back end of the blade 36. Preferably, the heel 120 is at all times maintained between the cutting edges 114 and 116 of the lower blade assembly 24 and has a thickness substantially that of the desired separation distance between the edges 38 and 40 of the blade 36. The heel 120 provides for continuous spreading of the blade member 90 away from the blade member 110 even when the upper blade assembly 22 is in the raised position as shown in FIGS. 1 and 2.

The blade assembly 22 is urged to the right as viewed in FIG. 1 and to the top as viewed in FIG. 4 by the force of a coil spring 130. The spring 130 is mounted on the shaft 44 and has one end maintained against the mount 48 such as by a washer 132 and its other end maintained at a predetermined axial position along the shaft 44 by a collar 134. Allen screws 136 are provided at circumferentially spaced locations on the collar 134 and may be utilized to adjust the axial position of the collar 134 on the shaft 44 to adjust the force imparted by the spring 130 on the assembly 22. This enables, for example, determination of the degree of engagement between blade edge 40 of the upper blade assembly 22 and blade edge 114 of the lower blade assembly 24. Movement of the collar 134 along the shaft 44 causes the spring 130 to impart a greater or lesser axial force on the shaft 44 and thus a greater or lesser degree of engagement between blade edges 40 and 114. The result is an adjustable scissor action between blade edges 40 and 114 upon downward pivotal movement of the blade assembly 22.

A scissor action is also obtained between blade edge 38 of the upper blade assembly 22 and blade edge 116 of the lower blade assembly 24 when the upper blade assembly 22 is made to pivot downwardly about the axis of the shaft 44. The force between the blade edges 38 and 116 is preferably adjusted by moving the blade member 90 on the pins 102 and 104. For example, to increase the force between the blade edges 38 and 116, the allen screws 106 are loosened and the member 90 urged towards the mount 52 to increase the compressive force on the heel 120 of the blade 36 located between the members 90 and 110. To facilitate this, the member 90 is preferably formed of a metal having resilient properties and dimensioned to enable the member 90 to be resiliently deflected slightly in the vertical plane under the influence of the heel 120 of the blade 36 when the member 90 is disposed on the pins 102 and 104 and forced against the heel 120 when the blade 36 is raised. In addition, it should be noted that urging of the member 90 towards the surface 100 increase the frictional engagement between both the blade edges 38 and 40 of the blade 36 and the corresponding blade edges of the lower blade assembly 24 since the compressive force on the blade 36 is increased.

The above-described features of the upper blade assembly 22 and base blade assembly 24, including the manner of adjusting the engagement between their respective blade edges, provides a very powerful cutting capability for the apparatus 20. For example, interaction of the assemblies 22 and 24 in a scissor-like manner as described enables easy cutting of relatively heavy denim belt loop strips which are ordinarily formed of a double layer or overlapped arrangement of fabric.

The belt loop material is preferably conveyed between the assemblies 22 and 24 on a generally planar conveying surface defined by an upper, generally planar surface 131 of the blade member 90. The member 90 is preferably substantially coplanar with an upper, generally planar rectangular surface 132 of the blade member 110. Of course, since the members 90 and 100 are maintained in a separated relationship, a gap exists between the blade edges 114 and 116 of the members 110 and 90 which presents a small discontinuity across the conveying surface.

The blade member 32 of the upper blade assembly 22 includes downwardly facing, generally planar surfaces 134 and 136 extending outwardly from opposite sides of the blade 36. The surface 134 faces the upper surface 131 of the blade member 90. The surface 136 faces the upper surface 132 of the blade member 110. As shown in FIG. 6, a slight space X separates the surfaces 134 and 136 from the surfaces 131 and 132, respectively, when the surfaces 134 and 136 are substantially parallel to the surfaces 131 and 132. Preferably, this parallel relationship between the noted surfaces would be attained after the belt loop material 26 had been fully cut across its width, and at the fully pivoted position of the upper blade assembly 22 as the when the assemblies 22 and 24 are applying maximum compression to opposed ends of adjacent belt loop strips captured between the surfaces. In particular, the trailing end of a previously cut belt loop strip is compressed between the surfaces 134 and 131. The leading end of a next belt loop strip is compressed between the surfaces 136 and 132. The separation distance X previously noted is selected according to the type of material from which the belt loop material 26 is constructed including its thickness, compressibility, etc., so that maximum compression can be obtained without damaging the apparatus 20. It is preferred that a pressure of at least 500 p.s.i. be applied in order to achieve adequate sealing, although the pressure may vary depending on the type of material and other factors as discussed above.

The upper blade assembly 22 is heated as by a resistance heating element 140 connected to a suitable current source. The element 140 preferably enters the assembly 22 from its back side as shown in FIG. 2 and is of a conventional construction and configuration. As shown in FIG. 7, the element 140 is disposed in a bore 142 formed in the blade member 32. Heat generated by the element 140 flows into the blade member 32 and block 30. Heat flowing into the blade member 32 raises the temperature of the blade 36 to a sufficient temperature to provide the required sealing of the belt loop material 26. The required temperature will vary depending on the type of material being sealed, the sealing material itself, the duration of the compression, and other factors.

The temperature of the blade 36 may be monitored and regulated by a pair of temperature monitors 144 and 146 disposed in the block 30. For example, the monitor 144 may be employed to insure that the blade assembly 22 is maintained at a desired temperature or within a desired temperature range and connected to suitable electrical devices capable of shutting off the apparatus 20 when the desired temperature or temperature range is not being maintained. The monitor 146 may be employed to regulate the current applied to the element 140 to maintain the assembly 22 at a desired temperature within a desired temperature range. It will be appreciated that the temperature is variable independently of the pressure applied to the material and the duration of the compression so that an optimum set of conditions can be determined depending on the material being sealed.

A preferred means for conveying the belt loop material 26 through the apparatus 20 comprises the combination of a reciprocating clip 150 and a pair of upper and lower rollers 152 and 154. The clip 150 is mounted to the left-hand side of the apparatus 20 as viewed in FIG. 1. With reference to FIGS. 1 and 8, the clip 150 is adjustably mounted on the end of a rod 156 carried by a double-acting pneumatic cylinder 158. Opposed serrated jaws 160 and 162 of the clip 150 are selectively movable towards and away from each other by a single-acting pneumatic cylinder 164 mounted on the end of rod 156, and are biased towards an open or separated configuration by a spring 166 connected to jaw 160. As will be described, the rollers 152 and 154 are operable to present the forward cut and sealed edge of the belt loop material 26 at a position just to the left of the apparatus 20 as shown in FIG. 1 following a cutting and sealing operation. With the edge presented thusly, pneumatic cylinder 158 is activated to advance the clip 150 to a position adjacent the side of the apparatus 20 with the cut and sealed end of the belt loop material 26 located generally between the jaws 160 and 162. Then, cylinder 164 is activated to urge the jaws 160 and 162 together against the influence of the spring 166 so that the end is firmly held between the jaws 160 and 162. The cylinder 158 is then activated to retract the rod 156, pulling the belt loop material 26 to the left as viewed in FIG. 1 until the length of the material 26 extending to the left of blade edges 38 and 116 of the assemblies 22 and 24 corresponds to the desired length of the belt loop strip to be formed.

The upper wheel 152 comprises a pair of spaced-apart roller halves 156 and 157. The halves 156 and 157 are rigidly connected together on an axle 166 shown in FIG. 1, which is journaled in spaced-apart fork members 167 and 168 best seen in FIG. 4 which are provided on the end of an elongate roller support arm 169. The arm 169 includes another pair of fork members 170 and 172 at its end opposite the end on which the upper wheel 152 is mounted. As shown in FIG. 3, these fork members 170 and 172 provide a pivotal connection between the roller support arm 169 and an H-shaped bracket 174. Upstanding, spaced-apart leg members 176 and 178 of the bracket 174 mount a pin 179 which in turn is received in openings formed in the fork members 170 and 172 to provide the noted pivotal connection between the roller support arm 169 and the bracket 174.

The pin 179 may be fixed in the bracket as by allen screws 180 located in the legs 176 and 178.

The bracket 174 is mounted adjacent the right-hand end of a rectangular plate 182 as shown in FIG. 1. An upper surface 184 of the plate 182 is generally coplanar with the upper surface 132 of the blade member 110 of the base blade assembly 24 and extends leftwardly as viewed in FIGURE 1 from adjacent the bracket 174 to the right-hand edge of the blade member 110.

The plate 182 is connected as by a rectangular member 186 attached to its undersurface and to the support member 50 on which the shaft 44 is mounted. As previously described, the support member 50 is in turn mounted on the plate 56 supporting the cylinder 68 used to pivot the upper blade assembly 22. Thus, the plate 182, support member 50, and plate 56 provide a rigidly interconnected support network for the various operative elements of the apparatus 20.

Upward movement of the upper roller 152 is restrained by a biasing assembly 190 mounted on the outside of fork member 168. The biasing assembly 190 includes an elongate allen head screw 192 threadably received in an opening formed in the upper surface 184 of the plate 182. The mid portion of the screw 192 is loosely received in a vertical opening (not shown) formed in a restraining block 194 fixedly mounted on the side of fork member 168. Between the block 194 and the head of the screw 192, a spring 196 is disposed and imparts a downwardly directed force against the upper surface of the block 194 urging the roller support arm 169 towards the upper surface 184 of the plate 182. The force applied to the arm 169 by the spring 196 may be adjusted by loosening or tightening the screw 192 as desired.

The lower roller 154 is mounted on an axle 200 journaled in a bearing mounted on the lower surface of the plate 182 and substantially parallel to and vertically aligned with the axle 166 supporting the upper roller 152. Preferably, the lower roller 154 has substantially the same diameter as the upper roller 152. When the material 26 is absent from the apparatus 20, the upper roller 152 rests on and is supported by the lower roller 154 by is weight and by the force of the biasing assembly 190 previously described.

Each of the rollers 152 and 154 preferably includes an outer surface defined by a plurality of protuberances arranged in a tread-like fashion. The protuberances may, for example, be in the form of regularly spaced radially outwardly projecting apexes configured to frictionally engage the material 26 between the rollers 152 and 154 and pull the material along the upper surface 184 of the plate 182 towards the assemblies 22 and 24. In this regard, it is noted that the lower roller 154 is presented adjacent the upper roller 152 through an opening (not visible) in the plate 182 and that the surface of the lower roller 154 in the opening projects slightly above or is level with the upper surface 184 of the plate 182. Thus, the nip or point of engagement between the rollers 152 and 154 is just slightly above or level with the upper surface 184 of the plate 182.

The belt loop material 26 is fed to the rollers 152 and 154 through an opening 202 viewable in FIG. 3 at the intersection between the bracket 174 and the plate 182, which opening 202 is located at the right-hand end of the apparatus 20 as viewed in FIG. 1. The bottom of the opening 202 is in the form of a ramp surface 204 gradually inclining up to the upper surface 184 of the plate 182. The walls defining the opening 202 act as an initial or rough guide to generally direct the belt loop material 26 in the direction of the rollers 152 and 154. Further along on the upper surface 184 of the plate 182 are provided a spaced-apart pair of plate-like guide members 205 and 206, both of which can be seen in FIG. 2 located on opposite sides of the material 26 which is shown located between the wheels 152 and 154. The guide members 205 and 206 are preferably adjustably mounted on the plate 182 by suitable means and disposed in a converging relationship in the direction of the wheels 152 and 154. At their ends closest to the wheels 152 and 154, the guide members 205 and 266 are spaced-apart by a distance just slightly greater than the width of the belt loop material 26 so that as the material 26 is moving to the left as viewed in FIG. 1, it is guided directly between the rollers 152 and 154 and maintained at substantially the same location between the cutting blade assemblies 22 and 24 at all times.

An idler roller assembly 210 is pivotally connected to the side of the roller support arm 169. The assembly 210 includes an idler roller 212 rotatably mounted on a pin 214 of a clevis 216. The clevis 216 is pivotally mounted to the roller support arm 169 as by means of an allen head screw 218. The pin 214 extends laterally from the member 216 and is restrained against upward movement by a spring 220 mounted on the guide plate 206 as by a hand-tightenable screw 222, thereby to bias the idler roller 212 downwardly against the belt loop material 26 as it moves towards the rollers 152 and 154. The assembly 210 therefore aids in keeping the material 26 between the guide members 205 and 206 since the material 26 is maintained against the upper surface 184 of the plate 182 as it approaches the members 204 and 206.

As previously mentioned, the rollers 152 and 154 are provided to move the belt loop strip 26 out beyond the side of the apparatus 20 so that the cut end of the material 26 may be pulled by the clip 150. Consequently, it is only necessary that the rollers 152 and 154 be configured to independently move the material 26 by a small amount. For this purpose, the apparatus 20 further includes upper and lower single-acting pneumatic cylinders 224 and 226.

A base end 228 of the upper cylinder 224 is fastened to an elevating brace 230 as by means of allen screw 232. (See FIG. 3). The brace 230 is in turn pivotally mounted on the pin 179 of the bracket 174 at the right-hand end of the apparatus 20 as shown in FIG. 1. The upper cylinder 224 carries a rod 234 which adjustably mounts a clevis 236 and its associated pin 238. The pin 238 pivotally connects the clevis 236 to a downwardly directed crank arm 240. The crank arm 240 is fixedly connected to the shaft 166 on which the upper roller 152 is mounted. Overriding clutch means (not shown) are disposed on the shaft 160 and interposed between the shaft 160 and the upper wheel 152. The clutch means are configured to be engaged to transmit forces to the roller 152 as the rod 234 is retracted in the cylinder 224 to cause a clockwise rotation of the upper roller 152 as viewed in FIG. 1. The roller 152 is thus free to rotate clockwise when the clip 150 is employed to pull the material 26 through the apparatus 20, but is engageable by the action of cylinder 224 to advance the material 26 by an incremental amount for the purpose described.

The stroke of the cylinder 224 is selected so that the distance between the fully advanced position of the clevis 236 and the fully retracted position of the clevis 236 is substantially equal to the length of the material 26 that must be moved beyond the nip of the rollers 152 and 154 to present the cut edge of the material 26 to the clip 150. Thus, activation of the cylinder 224 to retract the clevis 236 from its fully advanced position to its fully retracted position results in the material 26 being moved through the apparatus 20 by the appropriate amount.

The lower pneumatic cylinder 226 may be mounted to the plate 182 as by a downwardly projecting bracket 250 to which a base end 252 of the cylinder 226 is attached as shown in FIG. 1. The cylinder 226 carries a rod 254 which in turn adjustably mounts a clevis 256 and its associated pin 258 by which the clevis 256 is pivotally connected to an upwardly directed crank arm 260. The crank arm 260 is fixedly connected to the shaft 200 on which the lower wheel 154 is mounted. Similar to the upper wheel 152, the lower wheel 154 is provided with an overriding clutch means (not shown) mounted on the shaft 200 and configured to be engaged as the rod 254 is retracted in the cylinder 226 to transmit rotational forces to the lower wheel 154, thereby to induce counterclockwise rotation of the lower wheel 154. Also, as with the upper wheel 152, the lower wheel 154 is free to rotate counterclockwise when the clip 150 is employed to pull out a length of the belt loop material 26 as described.

The lower cylinder 226 is configured similarly to the upper cylinder in that its stroke is substantially equal to the length of the belt loop material 26 that is to be advanced out to the clip 150. Thus, activation of the cylinder 226 to move the clevis 256 from its fully advanced position to its fully retracted position produces substantially the same angular displacement of the lower wheel 154 as the angular displacement of the upper wheel 152 imparted through activation of the cylinder 224.

To insure that the cylinders 224 and 226 are activated simultaneously, their input ports are interconnected by a tube 270 in which a T connection is disposed such as a nipple fitting 272. The fitting 272 may be connected to a suitable source of compressed air (not shown) configured to activate the cylinders 224 and 226 at the time cylinder 158 is activated to advance clip 150 to receive the leading end of the belt loop. Supplying compressed air to the nipple fitting 272 causes simultaneous retraction of rods 234 and 254 of the cylinders 224 and 226 with a consequent simultaneous rotation of the upper and lower rollers 152 and 154 to feed the cut end of the strip 26 out beyond the left-hand side of the apparatus 20 so that it may be grasped and pulled by the clip 150. Control means (not shown) are employed to vary the timing of the advancement of material through the apparatus so that advancement is synchronized with the other activities of cutting, heating, and compressing described herein.

Use of the apparatus 20 with a conventional belt loop folding and feeding mechanism 282 is illustrated in FIG. 8. The apparatus 20 is mounted on a central mounting plate 280 adjacent the mechanism 282. Since the mechanism is of conventional design, the details of its construction will be omitted except where necessary to describe the interaction between the apparatus 20 and the mechanism 282. In this regard, it is noted that the mechanism 282 includes spaced-apart, double-tined members 284 and 286 which are elongate in configuration and mounted for rotation about their axes on the mechanism 282 in sleeves 288 and 290, respectively. Between the members 284 and 286, the mechanism 282 further includes a clamp 292 configured to releasably engage and support a center portion of the belt loop strip. The mechanism 282 is configured to reciprocate the double-tined members 284 and 286, and the clamp 292, to the left and the right as viewed in FIG. 8 so that the members 284 and 286, and the clamp 292, can be moved out of the way of the clamp 150 when it is advanced to the side of the apparatus 20 to pull the length of belt loop material 26 through the apparatus 20, and for other purposes described hereinafter.

Referring to FIGS. 9a through 9j in conjunction with FIG. 8, operation of the apparatus 20 and its interaction with the belt loop folding and feeding mechanism 282 will be described. Since FIGS. 9a through 9j are diagrammatic in nature, certain of the previously described elements of the apparatus 20 are omitted for clarity. Thus, although these elements may be mentioned in the following description, they may not be shown in these figures and reference should be had to the preceding discussion of FIGS. 1 through 8 for a detailed description thereof if necessary.

Initially, the material 26 is fed through the the apparatus 20 and positioned in the nip of rollers 152 and 154. The leading and, as yet unsealed, end of the material 26 is conveyed past the blade assemblies 22 and 24 by rollers 152 and 154 by activating cylinders 224 and 226. Cylinder 68 is activated to form a first, leading cut and sealed end 300 of the material 26 and the upper blade assembly 22 is then raised as shown in FIG. 9a. At this point, the cut and sealed end 300 is adjacent the right-hand blade edge 40 of the blade 36 as shown in FIG. 9a. To enable the strip 26 to be pulled through the apparatus by the clip 150, the cylinders 224 and 226 are again activated to rotate the upper and lower rollers 152 and 154 which moves the material 26 in the direction of arrows 302 along the upper surface 184 of the plate 182. This presents the leading end 300 in a position illustrated in FIG. 9b.

The clip 150 is advanced in the direction of arrow 304 to a position adjacent the side of the apparatus 20 and activated to engage the leading end 300 of the material 26. This is followed by retraction of the clip 150 as shown in FIG. 9d to pull the material 26 through the apparatus 20 in the direction of arrows 302. The final position of the clip 150 is selected so that the length of the material 26 between the cut and sealed end 300 and the left-hand side blade edge 38 of the blade 36 substantially corresponds to the desired length of the belt loop prior to folding thereof by the folding and feeding mechanism 282. With the clip 150 fully retracted as shown in FIG. 9d, the folding and feeding mechanism 282 is activated to advance the tined members 284 and 286, and clip 292, to a position as shown in FIG. 9e. The tines of the members 284 and 286 are disposed on opposite sides of the material 26 and the clamp 297 is positioned to supportingly engage the material 26. This configuration of the folding and feeding mechanism 282 is also illustrated in FIG. 7.

With the clip 150 and clamp 292 holding the material 26 as shown, the upper blade assembly 22 is moved towards the lower blade assembly 24 in a scissor-like fashion as described to cut the belt loop material 24 and define a strip 306 to the left of the apparatus 20 as shown in FIG. 9f. The assemblies 22 and 24 are held together to compress the material therebetween and heat the cut ends so that a cut and sealed end 308 is formed on the trailing end of the strip 306 opposite that of the cut and sealed end 300. Sealing of the ends 300 and 308 is accomplished simultaneously.

The upper blade assembly 22 is raised as shown in FIG. 9g and the clip 150 deactivated to release the cut and sealed end 300. During this time, the strip 306 remains supported and engaged by the clamp 292 so that the strip 306 is held in position prior to folding and feeding the strip 306. The tined members 284 and 286 are then spun on their axes such as in the direction of arrows 310 and 312 to fold the strip 306 inwardly upon itself as shown in FIG. 9h with the cut and sealed ends 300 and 308 disposed generally as shown. The folding and feeding mechanism 280 is then further activated to feed the folded strip 306 to a position above a throat plate 314 of a sewing machine 316 as illustrated in FIG. 9i and in an appropriate position beneath the needle 318 of the sewing machine 316 to enable the latter to sew the folded strip 306 to a garment (not shown). In accordance with a conventional arrangement, the machine 316 includes a presser foot assembly (omitted for clarity) which is configured to be activated to press and hold the folded strip 306 against the throat plate 314. The times 284 and 286 are then retracted for receipt of the next strip 306 from the apparatus, and the machine 316 is activated to sew seams through the folded ends of the belt loop. The cut and sealed ends 300 and 308 are therefore disposed between the outer part of the strip 306 and the garment, and are substantially hidden from view.

As the belt loop strip 306 is being attached to the garment as described above, the apparatus 20 is activated to incrementally advance the material 26 as shown in FIG. 9j to present a next leading cut and sealed end 320 of the belt loop material 26 for being pulled through the apparatus 20 by the clip 150 and the above process is repeated beginning as at FIG. 9c while the belt loop is being attached to the garment. It is noted that the method of cutting and sealing belt loop ends can in most cases be accomplished more rapidly than the folding and sewing steps so that no time is wasted waiting for preparation of the loops. For example, a conventional folding and sewing cycle for attachment of denim belt loops to blue jeans typically requires in excess of 3 seconds whereas the cutting and sealing operations can be completed in as little as 1.7 seconds.

Referring now to FIGS. 10 through 13, features of the strip 306 of belt loop material 26 having cut and sealed ends 300 and 308 constructed according to a preferred form of the present invention will be described. Referring first to FIGS. 10 and 11, the belt loop material 26 is shown prior to formation of the strip 306. In the preferred embodiment, the material 26 includes an inner core 330 of a meltable material, preferably one or more plastic strips. An outer layer 332 envelopes the core 330 and may be, for example, a denim fabric such as used in the formation of belt loops for blue jeans. The outer layer 332 is preferably formed by folding the material inwardly upon itself along its marginal edges 334 and 336 so as to enclose the meltable material 330 as shown in FIG. 11, and therefore assumes a flattened tubular configuration. Stitching 338 is provided along the length of the strip 26 and may be a cross stitched pattern as shown, straddling the juncture between the marginal edges 334 and 336 to permanently maintain the outer layer 332 in the indicated configuration about the core 330.

FIG. 12 illustrates the end 308 of the strip 306 after the strip 26 has been cut and shows the end 308 being heated and compressed between the surfaces 134 and 130 of the blade members 32 and 90, respectively. Heat is transferred to the material generally in the direction of arrows 340 causing the meltable material 330 to soften sufficiently so that it merges or becomes intermingled with the fibers and threads in surrounding portions of outer layer 332. Diffusion of the material 330 into the fabric of the outer layer 332 is improved by compression of the end 308 between the surfaces 130 and 134 as the end 308 is heated. After a sufficient period of time has passed to accomplish the necessary heating and compression of the end 310, the upper blade assembly 22 is raised and the strip 306 is ready for being subsequently processed into an appropriate belt loop shape and attached to a garment as described above. The same procedure on the other end 300 simultaneously produces a sealed region there as well. It should be noted that the ends 300 and 308 cool relatively rapidly following the cutting and sealing operation which enables substantially immediate processing of the strip 306. Further, upon cooling of the ends 300 and 308, the material 330 re-solidifies into a relatively rigid form adhering to the layer 332 and encasing the fibers and threads to hold the material of the outer layer 332 in position which substantially eliminates subsequent unraveling of the ends of the strip 306.

As an example of the use of he present apparatus and method of forming the belt loop strips 306, denim fabric and a strip of polyester plastic film were used to construct the belt loop material 26 as shown in FIGS. 10 and 11. The denim fabric was approximately 1 inch wide prior to formation of the material 26 and had a weight of about 14 ounces per yard. The polyester film was the polyester film sold under the trade designation Pellon SPL 150 by the Pellon Corporation of New York City, N.Y. One layer of plastic film was incorporated into the material 26. The stitching 338 was formed using a Union Special Double Needle Sewing Machine Model No. 57700. The material was introduced into the apparatus 20 as described and the strip 306 having sealed ends 300 and 308 was formed. The upper blade assembly 22 was maintained at a temperature of about 480° F. The ends of the belt loop strip 306 were compressed between the surfaces 130 and 134, and 132 and 136, for approximately 1.7 seconds. The cut and sealed ends 300 and 308 were sealed in regions 342 and 344 approximately 0.125 inches inwardly from the extreme longitudinal ends of the strip 306 which strip 306 was approximately 3.25 inches in total length. The regions 342 and 344 correspond substantially to the width of the downwardly facing surfaces 134 and 136 on opposite sides of the blade 36 of the blade member 32. After being folded to form a belt loop, the strip was attached to a pair of denim blue jeans. After repeated laundering of the blue jeans, no significant unraveling of the ends 300 and 310 was observed.

Although particular embodiments of the present invention have been illustrated and described in the foregoing detailed description, it will be understood by those of ordinary skill in the art that the invention is capable of numerous rearrangements, modifications, and substitutions without departing from the scope and spirit of the claims as set forth below.

What is claimed is:

1. An apparatus for producing individual belt loops from a ribbon of belt loop material having sealing material incorporated in the ribbon, comprising:
   means for gripping a leading end of the ribbon of belt loop material and pulling the material in a longitudinal direction through a cutting space of a work station so that a predetermined length of the material corresponding to the desired cut length of the individual belt loops extends between the gripped, leading end of the ribbon, and the cutting space;
   means located at the work station for cutting through the ribbon across its width in said cutting space to produce a belt loop of the predetermined cut length and to thereby define opposed cut ends comprising a trailing end of the belt loop and a new leading end of the ribbon of belt loop material; and
   means for sealing the ribbon only in a predetermined region adjacent to the opposed cut ends.

2. The apparatus of claim 1, wherein said cutting means and sealing means operate to cut and seal the belt loops substantially simultaneously.

3. An apparatus for producing belt loops, comprising:
   a length of fabric belt loop material adapted to be heat sealable at the cut ends to limit unraveling of the threads after being cut;
   first and second cutting and pressing members for being disposed on generally opposite sides of the belt loop material, said cutting and pressing members being configured to interact to cut the belt loop material across its width when moved together with the belt loop material located therebetween and to substantially simultaneously compress a length of the belt extending in opposite directions away from the location of the cut;
   means for supporting said cutting members in an opposed relationship on opposite sides of the material;
   means for moving at least one of said cutting and pressing members toward the other so that they move together to engage the material therebetween and cut and compress the material across its width as aforesaid to define opposed cut and compressed ends of the material; and
   means for heating at least one of said cutting and pressing members to a predetermined sealing temperature effective to heat seal the opposed cut and compressed ends of the material upon said cutting members being moved together to engage, cut, and press the material.

4. The apparatus of claim 3, further comprising means for urging said first and second cutting members together in a direction generally perpendicular to the direction of movement of said members when they are moved together to cut the belt loop material so that said cutting members interact in a scissor-like manner to effect the cut.

5. The apparatus of claim 3, further comprising means for independently controlling the pressure to which the cut ends are subjected, the duration of the compression, and the temperature to which said at least one cutting member is heated.

6. The apparatus of claim 3, further comprising:
   means for sequentially conveying the length of belt loop material through said space between said cutting and pressing members so that successive, spaced-apart cutting locations are sequentially disposed between said cutting said pressing members; and
   activation means for actuating said moving means to move said cutting and pressing members together when said cutting locations are disposed therebetween, whereby a plurality of belt loop strips are produced with each having opposed cut and sealed ends.

7. The apparatus of claim 3, wherein said first and second cutting members are configured to compress the opposed cut ends substantially simultaneously.

8. An apparatus for cutting and sealing a length of fabric belt loop material adapted to be heat sealable at the cut ends to limit unraveling of the threads after the ends are cut, comprising:
- first and second cutting members for being disposed on generally opposite sides of the belt loop material, said cutting members being configured to interact to cut the belt loop material across its width when moved together with the belt loop material located therebetween;
- means for movably supporting said cutting members in an opposed relationship on opposite sides of the material;
- means for moving said cutting members together so that they engage the material therebetween and cut the material across its width to define opposed cut ends of the material;
- means for heating at least one of said cutting members to a predetermined sealing temperature effective to heat seal the opposed cut ends of the material upon said cutting members being moved together to engage and cut the material; and
- said supporting means pivotally supporting said first and second cutting members for pivotal movement toward and away from each other and said cutting members being configured to interact in a scissor-like manner as they are moved together by said moving means to cut the belt loop material.

9. An apparatus for cutting and sealing a length of fabric belt loop material adapted to be heat sealable at the cut ends to limit unraveling of the treads after the ends are cut, comprising:
- first and second cutting members for being disposed on generally opposite sides of the belt loop material, said cutting members being configured to interact to cut the belt loop material across its width when moved together with the belt loop material located therebetween;
- means for movably supporting said cutting members in an opposed relationship on opposite sides of the material;
- means for moving said cutting members together so that they engage the material therebetween and cut the material across its width to define opposed cut ends of the material;
- means for heating at least one of said cutting members to a predetermined sealing temperature effective to heat seal the opposed cut ends of the material upon said cutting members being moved together to engage and cut the material;
- said first cutting member comprising a pair of closely adjacent, generally parallel blade edges formed on an elongate blade projection;
- said second cutting member comprising means defining a pair of elongate spaced-apart blade edges and an opening therebetween, said blade projection of said first cutting member being disposed in said opening so that one of said blade edges of said blade projection engages one of said blade edges of said second cutting member and the other of said blade edges of said blade projection engages the other of said blade edges of said second cutting member; and
- said first and second cutting members being further configured and arranged so that when said cutting members are moved together by said means for moving, said blade projection of said first cutting member is maintained in said opening and said blade edges of said first cutting member and said blade edges of said second cutting member interact in a scissor-type manner, whereby disposing the belt loop material between said first and second cutting members and moving said cutting members together cuts the belt loop material across its width to form said opposed cut ends of the material adjacent opposite sides of said blade edges of said first cutting member with the cut ends being separated by the distance between said blade edges of said first cutting member.

10. The apparatus of claim 9, further comprising means for resiliently urging said blade projection against one of said blade edges of said second cutting member.

11. The apparatus of claim 9, further comprising:
- generally planar side surfaces extending from opposite sides of an upper base end of said blade projection and spaced from said blade edges thereof towards said upper base end;
- generally planar surfaces disposed on each side of said blade edges of said second cutting member and extending away from said opening between said blade edges of said second cutting member;
- one of said side surfaces of said first cutting member being disposed in an opposed relationship with one of said surfaces of said second cutting member on the same side of said blade projection and the other of said side surfaces of said first cutting member being disposed in an opposed relationship with the other of said surfaces of said second cutting member on the same side of said blade projection and on the opposite side thereof from said one side surface of said first cutting member and said one surface of said second cutting member; and
- said first and second cutting members being configured and arranged so that said side surfaces of said first cutting member are generally parallel to said surfaces of said second cutting member when said members have been moved together to effect a cut of the belt loop material across its width and are spaced apart on respective sides of said blade projection following cutting of the material by a separation distance less than the uncompressed thickness of the belt loop material, whereby the opposed cut ends of the material adjacent opposite sides of said blade projection are compressed between said side surfaces of said first cutting member and said surfaces of said second cutting member when said first and second cutting members are moved together to cut the belt loop material and dispose said side surfaces of said first cutting member at said separation distance from said surfaces of said second cutting member.

12. The apparatus of claim 11, wherein said heating means is configured to heat said first cutting member to said predetermined temperature so that heat is transmitted to the belt loop material from said blade projection and from said side surfaces of said first cutting member during compression of the cut ends of the belt loop material between said side surfaces of said first cutting member and said surfaces of said second cutting member.

13. The apparatus of claim 9, wherein said heating means is configured to heat said first cutting member to said predetermined temperature so that heat is transmitted to the belt loop material from said blade projection.

14. The apparatus of claim 9, further comprising means for adjustably urging said blade edges of said second cutting member together to enable adjustment of the engagement between said blade edges of said first cutting member and said blade edges of said second cutting member.

15. The apparatus of claim 14, wherein said second cutting member is configured so that said blade edges are resiliently maintained in said spaced-apart relationship and said urging means resiliently urges said blade edges together.

16. The apparatus of claim 14, further comprising means for resiliently urging said blade projection against one of said blade edges of said second cutting member.

17. An apparatus for producing belt loop material, comprising:
  an elongate strip of fabric belt loop material incorporating along its length a fusible material having a softening temperature at which it softens and diffuses out into the fabric;
  first and second opposed sealing members;
  means for conveying the strip of belt loop material longitudinally between the first and second sealing members to sequentially dispose successive sealing locations between the sealing members;
  means for moving said first and second sealing members together for a predetermined period of time each time a sealing location is disposed between the members;
  said moving means being configured together with said first and second sealing members so that the strip of belt loop material is compressed between said members at each of the sealing locations when the locations are disposed between said members and said moving means brings said members together; and
  means for heating at least one of said sealing members to a predetermined sealing temperature, said sealing temperature being determined so that the strip is heated to a sufficient degree at the sealing locations to cause said fusible material to reach said softening temperature and therefore diffuse out into the fabric to seal the material at the sealing locations when said means for moving brings said sealing members together with said predetermined period of time, whereby the strip of the belt loop material is sealed at the sealing locations.

18. The apparatus of claim 17, wherein said sealing members are configured and dimensioned to compress and seal bands of the belt loop material therebetween at said sealing locations, said bands extending across the width of the belt loop material, and further comprises means for cutting the belt loop material across its width at about the midregion of each band.

19. The apparatus of claim 17, further comprising means for cutting the material across its width at the sealing locations to form adjacent strips of belt loop material having opposed cut and sealed ends.

20. The apparatus of claim 19, wherein said cutting means is configured to cut the material across its width at the sealing locations substantially simultaneously with said sealing members being moved together to seal the material at said sealing locations and prior to the material being compressed between said sealing members.

21. A method of cutting and sealing a length of fabric belt loop material adapted to be heat sealed on its cut ends to substantially prevent unraveling of the threads at the cut ends, comprising:
  gripping a leading end of the belt loop material and pulling the material through a cutting space located at a work station so that a predetermined length of the material is advance through the cutting space corresponding to a desired cut length of a belt loop;
  cutting the material at the work station across its width in the cutting space; and
  heating the material in a predetermined region located at the cut ends to a temperature sufficient to effect a seal of the cut ends.

22. The method of claim 21, further comprising compressing the material in the predetermined region at about the time the material in the predetermined region is heated.

23. The method of claim 22, wherein the fabric belt loop material is disposed at the work station by statically positioning a first cutting and sealing location at the work station whereupon the cutting, heating, and compressing operations are performed to form a leading cut and sealed end of a first strip of belt loop material, advancing the material through the cutting space work station to locate a next cutting and sealing location at the work station, statically positioning the next cutting and sealing location at the work station whereupon the cutting, heating, and compressing operations are performed to simultaneously form a trailing cut and sealed end of the first strip of belt loop material and a leading cut and sealed end of a next, succeeding strip of belt loop material, and repeating the advancing and static positioning of the material along with the cutting, heating, and sealing operations a desired number of times to produce a desired number of belt loop strips having leading and trailing cut and sealed ends.

24. The method of claim 22, wherein said steps of cutting, heating and compressing are performed substantially simultaneously.

25. The method of claim 22, further comprising independently controlling the pressure to which the cut ends are subjected, the duration of the compression, and the temperature to which the material is heated.

26. A method of cutting and sealing a length of heat sealable fabric belt loop material at predetermined longitudinally spaced-apart cut and seal locations along the length of the strip, comprising:
  conveying the strip between an opposed pair of cutting members to that successive cut and seal locations are sequentially disposed between the cutting members at predetermined time intervals;
  heating at least one of the cutting members to a predetermined sealing temperature;
  bringing the cutting members together to cut the strip across its width at each cutting location to define opposed cut ends of the material;
  compressing the opposed cut ends of the material strip between the cutting members for a predetermined period of time and at the predetermined time intervals each time a cut and seal location is disposed between the sealing members so that the opposed cut ends of the strip are compressed at each of the sealing locations; and
  the heating and compressing being sufficient to cause the that sealable strip to be sealed at each of the sealing locations as the strip is conveyed between the sealing members.

27. A method of sealing a strip of heat sealable belt loop material generally across its width and at predetermined longitudinally spaced-apart sealing locations along the length of the strip, comprising:
   providing a fabric strip in the form of an elongate flattened tube joined together along its marginal edges to substantially enclose an elongate portion of plastic material;
   conveying the strip through a sealing space located between an opposed pair of sealing members so that the successive sealing locations are sequentially disposed in the sealing space between the sealing members at predetermined time intervals;
   heating at lest one of the sealing members to a predetermined sealing temperature at least as high as the softening point of the plastic material;
   compressing a portion of the strip between the sealing members for a predetermined time and at the predetermined time intervals when the sealing locations are disposed between the sealing members to that the portion of the strip is compressed at each of the sealing locations as the strip is conveyed between the sealing members; and
   the heating and compressing being sufficient to cause the plastic material in the compressed portion of the strip adjacent the sealing locations to soften and become intermingled with the fabric portion, whereby the plastic hardens upon cooling and holds the fibers and thread in place adjacent he sealing locations to seal the strip of belt loop material at the sealing locations.

* * * * *

UNITED STATES PATENT AND TRADEMARK OFFICE
CERTIFICATE OF CORRECTION

PATENT NO. : 4,859,260

DATED : August 22, 1989

INVENTOR(S) : William A. Tice

It is certified that error appears in the above-identified patent and that said Letters Patent is hereby corrected as shown below:

Col. 5, line 67, "5" should be --52--.

Col. 11, line 12, "266" should be --206--.

Col. 15, line 25, "he" should be --the--.

Col. 20, line 8, "advance" should be --advanced --.

Col. 20, line 68, after "the" delete "that" and insert --heat--.

Col. 22, line 16, "thread" should be --threads--.

Col. 22, line 16, "he" should be --the--.

Signed and Sealed this

Fourteenth Day of August, 1990

Attest:

HARRY F. MANBECK, JR.

*Attesting Officer*      *Commissioner of Patents and Trademarks*